United States Patent
Dubois-Brugger et al.

(10) Patent No.: US 8,888,894 B2
(45) Date of Patent: Nov. 18, 2014

(54) USE OF A CONCRETE-BASED ELEMENT FOR TREATMENT OF GASES AND VOLATILE COMPOUNDS

(75) Inventors: Isabelle Dubois-Brugger, Chassieu (FR); Mélanie Dykman, Cremieu (FR); Matthieu Horgnies, Lyons (FR)

(73) Assignee: Lafarge, Paris (FR)

( * ) Notice: Subject to any disclaimer, the term of this patent is extended or adjusted under 35 U.S.C. 154(b) by 0 days.

(21) Appl. No.: 13/501,375

(22) PCT Filed: Oct. 11, 2010

(86) PCT No.: PCT/FR2010/052135
§ 371 (c)(1),
(2), (4) Date: Apr. 20, 2012

(87) PCT Pub. No.: WO2011/045509
PCT Pub. Date: Apr. 21, 2011

(65) Prior Publication Data
US 2012/0204719 A1  Aug. 16, 2012

(30) Foreign Application Priority Data
Oct. 12, 2009  (FR) ...................................... 09 04868

(51) Int. Cl.
*B01D 53/02* (2006.01)
*B01J 20/10* (2006.01)
*B01J 20/14* (2006.01)
*B01J 20/18* (2006.01)
*B01J 20/20* (2006.01)
*B01J 20/22* (2006.01)
*B01J 20/28* (2006.01)
*B28B 7/38* (2006.01)
*C04B 28/02* (2006.01)
*C04B 111/00* (2006.01)
*C04B 111/10* (2006.01)

(52) U.S. Cl.
CPC ............... *B01D 53/02* (2013.01); *B01J 20/103* (2013.01); *B01J 20/14* (2013.01); *B01J 20/18* (2013.01); *B01J 20/20* (2013.01); *B01J 20/226* (2013.01); *B01J 20/28004* (2013.01); *B01J 20/2803* (2013.01); *B01J 20/28042* (2013.01); *B01J 20/28057* (2013.01); *B01J 20/28078* (2013.01); *B01J 20/28085* (2013.01); *B28B 7/384* (2013.01); *C04B 28/02* (2013.01); *B01D 2253/10* (2013.01); *B01D 2253/102* (2013.01); *B01D 2257/106* (2013.01); *B01D 2257/302* (2013.01); *B01D 2257/404* (2013.01); *B01D 2257/502* (2013.01); *B01D 2257/504* (2013.01); *B01D 2257/708* (2013.01); *C04B 2111/00413* (2013.01); *C04B 2111/10* (2013.01); *Y02C 10/08* (2013.01)
USPC ................... 95/129; 96/137; 96/138; 96/139; 96/140; 96/141

(58) Field of Classification Search
USPC ............................................. 95/129, 137–141
See application file for complete search history.

(56) References Cited

U.S. PATENT DOCUMENTS 5,494,513 A  *  2/1996  Fu et al. ........................ 106/672
2005/0016418 A1    1/2005  Holbek
2010/0212550 A1 *  8/2010  Zhang et al. .................. 106/668

FOREIGN PATENT DOCUMENTS

EP          1 900 702 A1    3/2008
WO        WO 98/05601        2/1998

OTHER PUBLICATIONS

International Search Report for PCT/FR2010/052135.

* cited by examiner

*Primary Examiner* — Christopher P Jones
(74) *Attorney, Agent, or Firm* — Pillsbury Winthrop Shaw Pittman LLP

(57) ABSTRACT

A method includes using an element which includes a monoblock concrete body with a volume greater than 1 L and a surface porosity greater than 8%, which body includes in the body and/or on a surface thereof a compound having a BET specific surface greater than 100 m²/g, and which element does not include a photocatalytic agent, to absorb from the atmosphere a gas selected from the group consisting of nitrogen oxides, carbon oxides, sulphur oxides, and ozone, or a volatile organic compound.

11 Claims, 4 Drawing Sheets

USE OF A CONCRETE-BASED ELEMENT FOR TREATMENT OF GASES AND VOLATILE COMPOUNDS

CROSS-REFERENCE TO RELATED APPLICATIONS

This is the U.S. National Stage of PCT/FR2010/052135, filed Oct. 11, 2010, which in turn claims priority to French Patent Application No. 09/04868, filed Oct. 12, 2009, the entire contents of both applications are incorporated herein by reference in their entireties.

The present invention relates to the use of a concrete-based element for the removal of gases and volatile compounds from the atmosphere, in particular, nitrogen oxides, carbon oxides, sulphur oxides, ozone and volatile organic compounds from the atmosphere.

Many volatile compounds contribute to air pollution. Among these are nitrogen oxides, also called NOx, which in particular come from the combustion of (fossil) energy in thermal engines (exhaust fumes from motor vehicles, boilers, etc.).

Several patent applications describe processes for the removal of volatile compounds and/or gases, in particular, nitrogen oxides, which consist in using an element comprising a concrete body and particles with a photocatalytic effect, disposed in the mass of the concrete body or in a coating covering the concrete body.

By way of example, international patent application WO9805601 filed in the name of Italcementi SPA describes a hydraulic binder which contains photocatalytic particles in the mass, for example, anatase titanium dioxide (photocatalytic), capable of oxidizing the removal of pollutants in the presence of light, oxygen and water.

One disadvantage of the processes described in these patent applications is that they use photocatalytic agents. The photocatalytic agents are generally high cost materials. Moreover, the processes described in these patent applications are based on the principle that oxidation of the pollutants is carried out in the presence of light, so that the de-polluting action of the processes described in these patent applications takes place during only a part of the day and when weather conditions are favourable.

The aim of the present invention is to propose a process for the removal of volatile compounds and/or gases from the atmosphere using a concrete-based element which does not comprise a photocatalytic agent.

This aim is attained by the use of an element for adsorption of at least one volatile compound from the atmosphere and/or a gas from the atmosphere from the group comprising nitrogen oxides, carbon oxides, sulphur oxides, ozone and volatile organic compounds from the atmosphere, the aforesaid element having a surface porosity strictly greater than 8%, the aforesaid element comprising a monoblock concrete body whose volume is greater than 1 L and, in the concrete body and/or on the surface of the concrete body, a compound having a BET specific surface exchange area greater than 100 $m^2/g$, the aforesaid element not comprising a photocatalytic agent, in particular, photocatalytic titanium dioxide.

The invention offers the advantage of contributing to reducing the concentration of nitrogen oxides, carbon oxides, sulphur oxides, ozone and volatile organic compounds in the atmosphere.

Another advantage of the present invention is that the element can furthermore be used as a structural, insulating or decorative element depending on the properties of the concrete body.

Finally, the invention has the advantage of being able to be used in the construction industry, cement industry, in the construction markets (building, civil engineering, roads or prefabrication factory), or in concrete mixing plants.

Other advantages and characteristics of the invention will become clear upon reading the following description and purely illustrative and non-restrictive examples.

The term "hydraulic composition" is to be understood as any composition capable of hydraulic setting and, particularly, mortars and concretes intended for all construction markets (building, civil engineering or prefabrication factory).

The expression "hydraulic binder" is to be understood, according to the present invention, as a pulverulent material which, mixed with water, forms a paste which sets and hardens owing to hydration reactions and processes, and which after hardening retains its strength and its stability even under water. The hydraulic binder can be a cement, for example, a Portland cement.

The expression "Portland cement" is to be understood, according to the invention, as a cement of the CEM I, CEM II, CEM III, CEM IV or CEM V type according to the "Cement" NF EN 197-1 Standard.

The term "concrete" is to be understood as a mix of hydraulic binder, aggregates, water, optionally additives, and optionally mineral additions, for example, high performance concrete, very high performance concrete, self-placing concrete, self-levelling concrete, self-compacting concrete, fibre concrete, draining (permeable) concrete, lightweight concrete, ready-mix and/or coloured concrete. The term "concrete" is also to be understood as concretes that have been submitted to a finishing operation such as bush-hammered concrete, exposed or washed concrete, or polished concrete. Pre-stressed concrete is also to be understood by this definition. The term "concrete" comprises mortars. In this specific case, the concrete comprises a mix of hydraulic binder, sand, water and optionally additives and optionally mineral additions. The term "concrete" according to the invention denotes without distinction fresh concrete or hardened concrete.

The term "aggregates" is to be understood according to the invention, as gravel, coarse gravel and/or sand.

The term "sands" is to be understood as aggregates of an average particle size of 0 to 6 mm, preferably 0 to 4 mm (and strictly greater than 0 mm). They can be of any mineral kind, calcareous, siliceous or silico-calcareous or other. This definition also comprises fillers or other particulate inorganic materials likely to be present in hydraulic compositions.

The term "coarse gravel" is to be understood according to the present invention as aggregates having a particle size of 4 to 20 mm, preferably from 6 to 20 mm.

The term "gravel" is to be understood according to the present invention as aggregates having a particle size strictly greater than 20 mm. The expression "removal of volatile compounds and/or gases" is to be understood as the withdrawal of volatile compounds and/or gases from the atmosphere, without there necessarily being a modification of the chemical structure of these volatile compounds and/or these gases.

The expression "photocatalytic agent" is to be understood as any material suited to accelerate the speed of a chemical reaction under the action of light, for example, photocatalytic titanium dioxide.

By "active carbon" or "activated carbon" is meant a material in the form of a powder mainly constituted of carbonaceous matter with a micro porous structure.

The expression "modified active carbon" is to be understood as active carbon grafted with additional chemical functions (for example, amine functions or ether, cyclodextrin, etc. functions) or thermally treated.

The inventors have shown that, contrary to what is generally assumed, adsorption of gases from the atmosphere and/or volatile compounds from the atmosphere could be obtained without using photocatalytic agents. This is obtained by using an element having a surface porosity strictly greater than 8%, the aforesaid element comprising a monoblock concrete body whose volume is greater than 1 L, in the concrete body and/or on the surface of the concrete body, a compound having a BET specific surface exchange area greater than 100 $m^2/g$, the aforesaid element not comprising a photocatalytic agent.

The inventors have shown an adsorption of volatile compounds from the atmosphere and gases from the atmosphere on the surface of the concrete and the surface of the compound having a specific surface area of BET exchange greater than 100 $m^2/g$. Preferably, the BET specific surface exchange area of the compound is greater than 200 $m^2/g$, advantageously greater than 500 $m^2/g$.

The element according to the invention is used for the adsorption of gases from the atmosphere or volatile compounds from the atmosphere. It therefore relates to the adsorption of gases and/or volatile compounds present in the air breathed by any individual, whether inside or outside a building. The element according to the invention is therefore in direct contact with the atmosphere. The present invention does not relate to the adsorption of gases or volatile compounds present in exhaust fumes from industrial facilities, for example, from industrial furnaces.

The body is made of concrete, that is to say, of a mix of at least one hydraulic binder, aggregates and water. When the aggregates only comprise sand, concrete can be called "mortar." Preferably, the concrete is not a cement slurry which corresponds to a mix of cement and water and which does not comprise aggregates.

According to an example of an embodiment, the volume of the concrete body is greater than 1 L, preferably greater than 10 L, more preferably greater than 100 L, in particular, greater than 1 $m^3$.

Preferably, the compound is selected from the group comprising active carbon, modified active carbon, silica gel, pyrogenic silica, diatomite, zeolite, alumina, fly-ash and porous hybrid solids, also called "coordination polymers" (for example, Metal-Organic Frameworks—MOFs or Covalent Organic Frameworks—COFs). Preferably, the compound is active carbon.

Preferably, the compound comprises particles having an average diameter greater than 1 µm. Advantageously, the compound comprises particles having a diameter of 0.1 to 100 µm. The diameter of a particle corresponds to the diameter of a sphere of the same volume as the particle. The average diameter of particles corresponds to the average of the diameters of the particles. The diameter and the average diameter can be measured by observation under the microscope (optical or electronic).

The element has a surface porosity greater than 8%, preferably greater than or equal to 10%, advantageously greater than or equal to 13%. Preferably, the concrete body has a surface porosity greater than 8%, preferably greater than or equal to 10%, advantageously greater than or equal to 13%. The average diameter of the pores in the surface of the concrete body is greater than 0.10 µm, preferably greater than 0.25 µm, preferably greater than 0.30 µm. The average diameter of the pores in the surface of the concrete body and the surface porosity are, for example, measured by mercury porosimetry.

The rate of adsorption of each volatile compound from the atmosphere or gas from the atmosphere can be different according to the type of volatile compound or gas. Preferably, the rate of adsorption of nitrogen dioxide per unit surface of the element is greater than 0.5 $ppbv/cm^2$, in particular, with a nitrogen dioxide flow of 250 ppbv (parts per billion by volume). Advantageously, the rate of adsorption of nitrogen dioxide per unit surface is greater than 0.5 $ppbv/cm^2$ at 60 hours.

The inventors have shown that absorbed nitrogen monoxide could be released by heating the concrete element, whilst the absorbed nitrogen dioxide was not released by heating the concrete element, in particular, up to a temperature of the order of 130° C.

The compound may be added in the concrete mass. In this case, the compound can be added, in particular, in the form of solid particles, at the time of mixing the aggregates, the hydraulic binder and the water during manufacture of the concrete. By way of a variant, the compound may be mixed in the form of solid particles with the hydraulic binder to obtain a premix.

According to an example of an embodiment, the concrete body comprises in the mass 0.001 to 30%, preferably 0.01 to 20%, more preferably 0.1 to 10%, by mass of the compound relative to the mass of cement contained in the concrete body.

The concrete body may be obtained by pouring the concrete into a mould, the compound being put in a demoulding composition, for example, a demoulding oil, in order to obtain at least a partial transfer of the compound from the walls of the mould to the surface of the concrete body.

The demoulding composition comprises 0.001 to 30%, preferably 0.01 to 20%, more preferably 0.1 to 10%, by mass of the compound relative to the mass of the demoulding composition.

Preferably, the demoulding composition comprises at least one oil and at least one calcium salt. Preferably, the oil is an oil of vegetable or animal origin. Particularly preferred is a demoulding composition in which the oil comprises one or more compounds selected from fatty acid esters, and in particular fatty acid triglycerides, and neopentyl polyol fatty acid esters. The calcium salt is preferably selected from calcium chloride, bromide, nitrite and thiocyanate.

Advantageously, the composition comprises 0.1 to 70% by weight of calcium salt. The demoulding composition may in particular be formulated in the form of a solution, an emulsion or a suspension. The demoulding composition may furthermore comprise, one or more compounds selected from a stabilizer, a dispersant, a surfactant, a preservative, a solvent, a thickener and a thixotropic agent, in particular, one or more compounds selected from a water-repellent agent and a pigment. It may in particular comprise as the water-repellent agent, products containing silicones, silanes, siloxanes or metal salts of fatty acids. It may, in particular comprise as the pigment, one or more inorganic oxides or hydroxides and particularly one or more pigments selected from titanium dioxide, oxides of iron, cobalt or chromium.

The coating of the mould with the demoulding composition may be carried out by known means, for example, by brush, cloth or roller application, by dipping or by spraying, the latter mode of application being preferred.

The quantity of demoulding composition to be applied is chosen in order to be sufficient to form a continuous film on the entire surface of the mould intended to be in contact with the hydraulic setting composition. The thickness of the film of the demoulding composition is generally of the order of 1 to 15 µm.

As an indication, it is generally sufficient to apply 5 to 30 g/m², for example, 5 to 15 g/m², of a demoulding composition having a viscosity of approximately 50 mPa·s onto a metal mould. The quantity applied will be greater on absorbent moulds, for example, wood, or for a formulation with a higher viscosity.

Examples of embodiments will now be described in relation to the Figures, in which.

EXAMPLES

Figure 1:
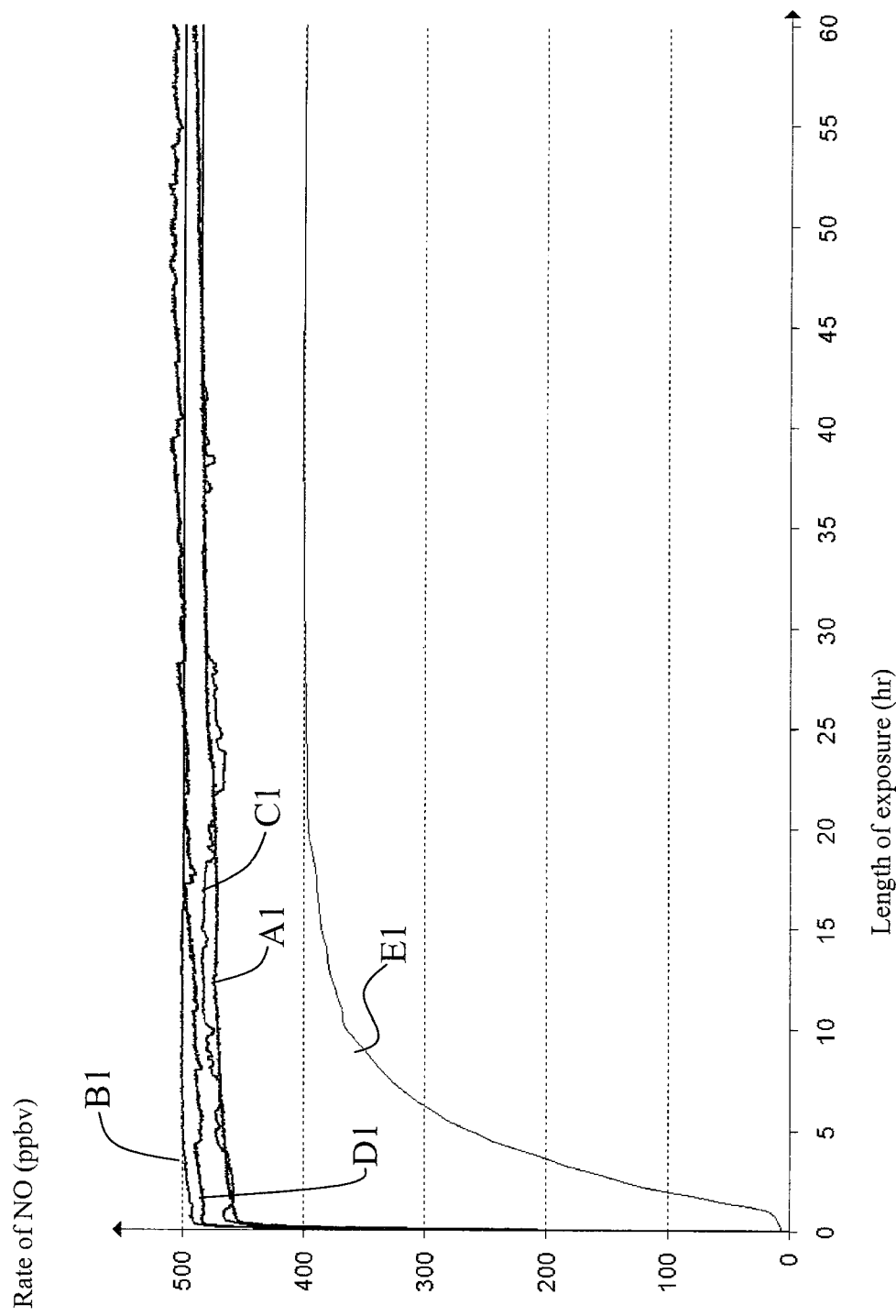
FIGS. 1 and 2 represent the changes, respectively, in the contents of nitrogen monoxide and nitrogen dioxide of a gas flow after passage on several samples.

The present invention is illustrated by the following non-restrictive examples. In the examples, the materials used are available from the following suppliers:

|  | Product | Supplier |
|---|---|---|
| (1) | Portland cement | Lafarge France Val d'Azergues |
| (2) | Portland cement | Lafarge France St. Pierre La Cour |
| (3) | White Portland cement | Lafarge France Le Teil |
| (4) | TX active cement with photocatalytic $TiO_2$ | Italcementi |
| (5) | 0-1 mm sand | Lafarge France (St. Bonnet La Petite Craz) |
| (6) | 0-4 mm sand | Lafarge France (St. Bonnet La Petite Craz) |
| (7) | 1-5 mm sand | Lafarge France (St. Bonnet La Petite Craz) |
| (8) | BE01 sand (D50-307 µm) | Sibelco France (SIFRACO BEDOIN Quarry) |
| (9) | BETOCARB HP Orgon limestone filler | OMYA |
| (10) | Durcal 1 limestone filler | OMYA |
| (11) | MST silica fume | SEPR (European Company for Refractory Products) |
| (12) | 5-10 mm gravel | Lafarge France (St. Bonnet La Petite Craz) |
| (13) | Optima 203 admixture | Chryso |
| (14) | Ductal F2 admixture | Chryso |
| (15) | Dem ECO2 vegetable oil | Chryso |
| (16) | SA2 active carbon | NORIT |

Mortar Formulation

Mortar formulation (1) used to carry out the trials is described in the Table 1 below:

TABLE 1

| Mortar formulation (1) | |
|---|---|
| Component | Proportion (% by weight compared to the weight of the composition) |
| Portland cement, Lafarge Val d'Azergues | 23.6 |
| BETOCARB HP Orgon limestone filler | 12.2 |
| 0-4 sand | 51.2 |
| Pre-wetting water | 1.1 |
| Mixing water | 11.7 |
| Optima 203 admixture | 0.26 |

The mixing water/cement ratio is 0.496.

The Portland cement from Lafarge is a CEM I 52.5 PMES cement.

Method for Preparation of the Mortar

The mortar is produced by means of a Perrier type mixer. The entire operation is carried out at 20° C. The preparation method comprises the following steps:

Put the sand in a mixer bowl;

At T=0 second: begin mixing at low speed (140 rpm) and simultaneously add pre-wetting water for 30 seconds, then continue mixing at low speed (140 rpm) up to 60 seconds;

At T=1 minute: stop mixing and let rest for 4 minutes;

At T=5 minutes: add the hydraulic binder;

N T=6 minutes: mix for 1 minute at low speed (140 rpm);

At T=7 minutes: add the mixing water in 30 seconds (whilst mixing at low speed (140 rpm)); and At T=7 minutes and 30 seconds: mix for 2 minutes at low speed (140 rpm).

Concrete Formulation

Concrete formulations (2), (3), (4) and (5) used to carry out the trials are described in Tables 2, 3, 4 and 5 below:

TABLE 2

| Concrete formulation (2) | |
|---|---|
| Component | Proportion (% by weight compared to the weight of the composition) |
| Portland cement, Lafarge Val d'Azergues | 16.5 |
| BETOCARB HP Orgon limestone filler | 8.5 |
| 0-4 sand (water content 2.19%) | 35.8 |
| 5-10 gravel (water content 0.26%) | 29.2 |
| Mixing water | 8.1 |
| Optima 203 admixture | 1.9 |

The water/cement ratio is 0.493.

TABLE 3

| Concrete formulation (3) | |
|---|---|
| Component | Proportion (% by weight compared to the weight of the composition) |
| TX active cement, Italcementi | 16.5 |
| Limestone filler | 8.5 |
| 0-4 sand (water content 2.19%) | 35.8 |

TABLE 3-continued

Concrete formulation (3)

| Component | Proportion (% by weight compared to the weight of the composition) |
|---|---|
| 5-10 gravel (water content 0.26%) | 29.2 |
| Mixing water | 8.1 |
| Optima 203 admixture | 1.9 |

The water/cement ratio is 0.493.

TABLE 4

Ultra high performance concrete formulation (4)

| Component | Proportion (% by weight compared to the weight of the composition) |
|---|---|
| White Portland cement, Lafarge Le Teil | 31.0 |
| DURCAL 1 limestone filler | 9.3 |
| MST silica fume | 6.8 |
| BE01 sand | 44.4 |
| Mixing water | 7.1 |
| Ductal F2 admixture | 1.4 |

The water/cement ratio is 0.26. It is an ultra high performance non-fibre concrete.

TABLE 5

Concrete formulation (5) with active carbon added in the mass

| Component | Proportion (% by weight compared to the weight of the composition) |
|---|---|
| Portland cement, Lafarge St. Pierre La Cour | 16.4 |
| BETOCARB HP Orgon limestone filler | 8.4 |
| Active carbon | 0.25 |
| 0-1 sand | 26.3 |
| 1-5 sand | 8.8 |
| 5-10 gravel | 29.3 |
| Pre-wetting water | 3.4 |
| Mixing water | 6.9 |
| Optima 203 admixture | 0.25 |

The effective water/cement+additions ratio is 0.59. The Portland cement from Lafarge is a CEM I 52.5 PMES cement.

Method for Preparation of Concrete According to Formulations (2), (3) and (5)

The concrete is produced by means of a SIPE type mixer. The entire operation is carried out at 20° C. The preparation method comprises the following steps:

At T=0 second: put the gravel and sands in the mixer bowl and mix for 20 seconds;

At T=20 seconds: add cement and the filler (and the active carbon if necessary) and mix for 15 seconds (140 rpm); and At T=35 seconds: add water and the admixture and mix for 180 seconds (140 rpm).

Method for Preparation of Ultra High Performance Concrete According to Formulation (4)

The ultra high performance concrete is produced by means of a RAYNERI type of mixer. The entire operation is carried out at 20° C. The preparation method comprises the following steps:

At T=0 second: put the cement, the limestone fillers, silica fume and sand in the mixer bowl and mix for 7 minutes (15 rpm);

At T=7 minutes: add the water and half of the mass of the admixture and mix for 1 minute (15 rpm);

At T=8 minutes: add the remainder of the admixture and mix for 1 minute (15 rpm);

At T=9 minutes: mix for 8 minutes (50 rpm); and

At T=17 minutes: mix for 1 minute (15 rpm).

Method for the Manufacture of a Sample

Concrete or mortar is prepared according to one of the formulations (1)-(5) of Tables 1 to 5 hereinabove. One hour before pouring the concrete or the mortar, a steel mould is coated by spraying a liquid form-removal agent at a rate of 15 g/m². The sample is removed from the mould after 20 hours and stored at least 28 days at ambient atmosphere (temperature of 25° C. and humidity of 50%).

The sample has a parallelepiped form having a height of approximately 15 cm, a width of approximately 12 cm and a thickness of approximately 1.5 cm. The lateral faces and one of the large faces of the sample are covered with a resin and are thus made waterproof. The remaining large free face has a surface area of 180 to 200 cm².

Method for Measurement of the BET Specific Surface Area

The specific surface area of the various powders is measured as follows. A sample of powder of 0.3 to 0.75 g by mass is taken for a BET surface area estimated at more than 15 m²/g. A 9 cm³ cell is used. The measuring assembly (cell+glass rod) is weighed. Then the sample is added into the cell. The assembly (cell+glass rod+sample) is weighed. The measuring cell is placed on a degassing unit, and the sample is degassed. The pressure to be reached is 25 to 30 mTorr. The duration to reach this pressure depends on the nature of the sample, the quantity of matter and the number of cells on the degassing unit. The degassing step makes it possible to remove any adsorption ($H_2O$, $CO$, $CO_2$, etc.) from the surface of the sample. The mass of the sample is obtained by subtracting the mass of the cell from the mass of the cell+degassed sample.

The sample is then analyzed after placing it on the measurement unit. The analyzer is a Tristar II 3020, commercialised by the Micromeritics company. The measurement is based on the adsorption of nitrogen by the sample at a given temperature, in this case, the temperature of liquid nitrogen. that is −196° C. The apparatus measures the pressure of the reference cell in which the adsorbate is at its saturated vapour pressure and the pressure of the sample cell into which known volumes of adsorbate are injected. The resulting curve from these measurements is the adsorption isotherm. In the measurement process, it is necessary to know the dead volume of the cell: a measurement of this volume is therefore carried out with helium before the analysis.

The mass of the sample calculated beforehand is entered as a parameter. The BET surface area is determined by the software by linear regression from the experimental curve. The three samples below are regularly measured in order to serve as a reference for the apparatus:

| | Average BET (m²/g) | Standard deviation |
|---|---|---|
| BCR alumina 1.05 m²/g | 1.02 | 0.02 |
| Omyacoat 850 | 9.38 | 0.04 |
| Carbon 30.6 ± 0.75 m²/g | 30.4 | 0.25 |

Method for Measurement of the Surface Porosity and Average Entrance Diameter of the Surface Pores (Mercury Porosimetry)

An Autopore III mercury porosimeter was used. The concrete samples analyzed are in the form of small blocks of a typical dimension of several millimeters to 1 cm, and they are dried beforehand at 45° C. for 8 hours. The mercury is put in contact with a sample, and pressure is exerted on the sample to make the mercury penetrate into the pores of the sample. The volume of mercury penetrating into the pores of the sample under the action of the pressure is measured, by a capacitive system, as a function of the pressure applied to the sample. Washburn's equation (1) makes it possible to relate the pressure to the diameter of the pores. Calculations of porosity are based on the equation which expresses the penetration of a non-wetting liquid (mercury) into the pores of a porous material. The calculation is made by considering that the wetting angle of the mercury is 130° (on glass as on most solids) and the surface tension is equal to 480 mN/m (at 20° C.).

$$P = \frac{-\gamma \cos\theta}{r} \quad (1)$$

P is the mercury pressure (Pa),
$\gamma$ is the surface tension of the liquid (N/m),
$\theta$ is the contact angle between the solid and liquid.
r is the pore diameter.

It should be noted that the calculated diameter actually corresponds to the entrance diameter of the pore. The distribution of porosities, given by the measurement of porosity by mercury intrusion, is expressed in % or milliliter of mercury per gram of sample. The average diameter of the pores in the surface of the concrete body was found by noting the majority population of the recorded pore diameters; this average diameter is expressed in μm.

Measurements of mercury porosity (MIP) are made on concrete samples as they are and on others coated by resin, in order to leave only the apparent surface. The resin being supposed to be nonporous, mercury can then penetrate into the sample only by the surface. Comparison of the two measurements of porosity makes it possible to deduce whether the sizes of the pores are the same on the surface and at the core of the sample. The mass used for calibration is the mass of the sample without resin, because the mass of the sample with resin is distorted by the presence of resin.

Method for Measurement of the Adsorption of Nitrogen Oxides by a Sample

The method consists of placing a sample in a chamber (cylindrical sample with circular base diameter of 22 cm and 10 cm height, that is to say, a volume of 3.8 liters) in which a gas flow is made to circulate, with a flow of 1 L/min, comprising nitrogen oxides and, to measure the quantity of nitrogen oxides contained in the gas flow downstream of the chamber.

The gas flow comprises a homogeneous mix of nitrogen having a relative humidity of 60%, nitric oxide (NO) with a concentration of 500 ppbv (parts per billion by volume) and nitrogen dioxide ($NO_2$) at a concentration of 250 ppbv.

A sample having a surface area of 180 to 200 $cm^2$ is used. Measurements of NO and $NO_2$ concentrations in the gas flow downstream of the sample are made periodically, for example, every minute. NOx concentrations are monitored on line by chemiluminescence. The detection thresholds of this type of analyzer are in the region of 1 ppbv.

Example 1

A concrete having the previously described formulation (2) was prepared. A sample, "A," was made with this concrete according to the previously described method to manufacture a sample in which the demoulding agent is composed of Dem ECO2 vegetable oil. The surface porosity of sample A is 13%, and the entrance diameter of the surface pores is 0.32 μm.

A measurement of the adsorption of nitrogen monoxide and nitrogen dioxide by sample A was carried out according to the previously described method for measurement of the adsorption of nitrogen oxides.

Example 2

A concrete having the previously described formulation (4), which corresponds to an ultra high performance concrete, was prepared. A sample, "B," was made with this concrete according to the previously described method to manufacture a sample in which the demoulding agent is composed of Dem ECO2 vegetable oil. The surface porosity of sample B is 8%, and the entrance diameter of the surface pores is 0.02 μm.

A measurement of the adsorption of nitrogen monoxide and nitrogen dioxide by sample B was carried out according to the previously described method for measurement of the adsorption of nitrogen oxides.

Example 3

A concrete having the previously described formulation (3), which corresponds to a concrete containing photocatalytic titanium dioxide, was prepared. A sample, "C," was made with this concrete according to the previously described method to manufacture a sample in which the demoulding agent is composed of Dem ECO2 vegetable oil. The surface porosity of sample C is 10%, and the entrance diameter of the surface pores is 0.10 μm.

A measurement of the adsorption of nitrogen monoxide and nitrogen dioxide by sample C was carried out according to the previously described method for measurement of the adsorption of nitrogen oxides.

Example 4

A mortar having the previously described mortar formulation (1) was prepared. A sample, "D," was made with this mortar according to the previously described method to manufacture a sample in which the demoulding agent comprises Dem ECO2 vegetable oil and 5% by weight of active carbon relative to the weight of form-removal agent. The specific surface area of the activated carbon is 695 $m^2/g$ (+/−50) and was measured by the previously described method for measurement of the BET specific surface area. The surface porosity of sample D is 16%, and the entrance diameter of the surface pores is 0.39 μm.

A measurement of the adsorption of nitrogen monoxide and nitrogen dioxide by sample D was carried out according to the previously described method for measurement of the adsorption of nitrogen oxides.

Example 5

A mortar having the previously described mortar formulation (5) and comprising 1.5% by weight of active carbon relative to the weight of the cement, was prepared. A sample, "E," was made with this mortar according to the previously described method to manufacture a sample in which the form-removal agent comprises Dem ECO2 vegetable oil. The specific surface area of the active carbon is 695 $m^2/g$ (+/−50) and was measured by the previously described method for measurement of the BET specific surface area. The surface porosity of sample E is 18%, and the entrance diameter of the surface pores ranges between 0.22 and 0.60 μm.

A measurement of the adsorption of nitrogen monoxide and nitrogen dioxide by sample E was carried out according to the previously described method for measurement of the adsorption of nitrogen oxides.

FIG. 1 represents the curves A1, B1, C1, D1 and E1 of the content of nitric oxide of a gas flow respectively after its passage on samples A, B, C, D and E. Curve D1, which corresponds to a mortar sample, can be compared with curves A1, B1 and C1, which correspond to concrete samples. Indeed, the surface properties (in particular, surface porosity) of a sample are directly related to the skin of the sample (the first millimeters of thickness of the sample) and are independent of the presence or absence of aggregates in the sample. Therefore, the same curve D1 would be obtained with a concrete equivalent to the mortar of formulation (1).

Each curve A1, B1, C1 and D1 include an initial adsorption phase of nitric monoxide, which lasts approximately one hour, followed by a phase during which the sample does not substantially adsorb any more monoxide, given that the content of nitric monoxide in the flow downstream is substantially identical to the content (500 parts per billion by volume or 500 ppbv) upstream of the sample. Curve E1 shows that the NO adsorption phase is more significant and lasting throughout the entire duration of exposure. An adsorption rate of 5.0 ppmv/m$^2$ (parts per million by volume per square meter) in NO is thus calculated.

Figure 2:
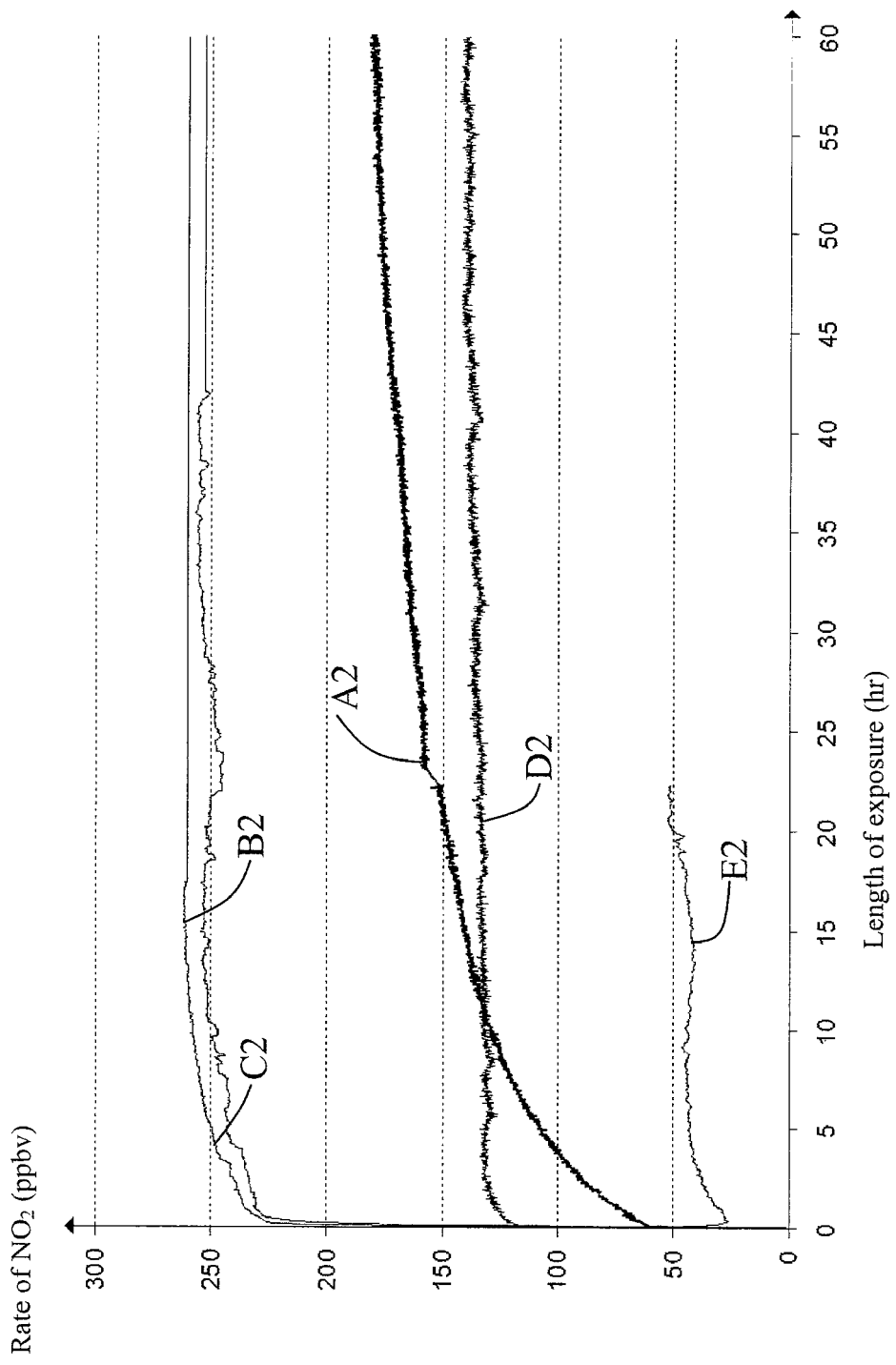
Figure 3:
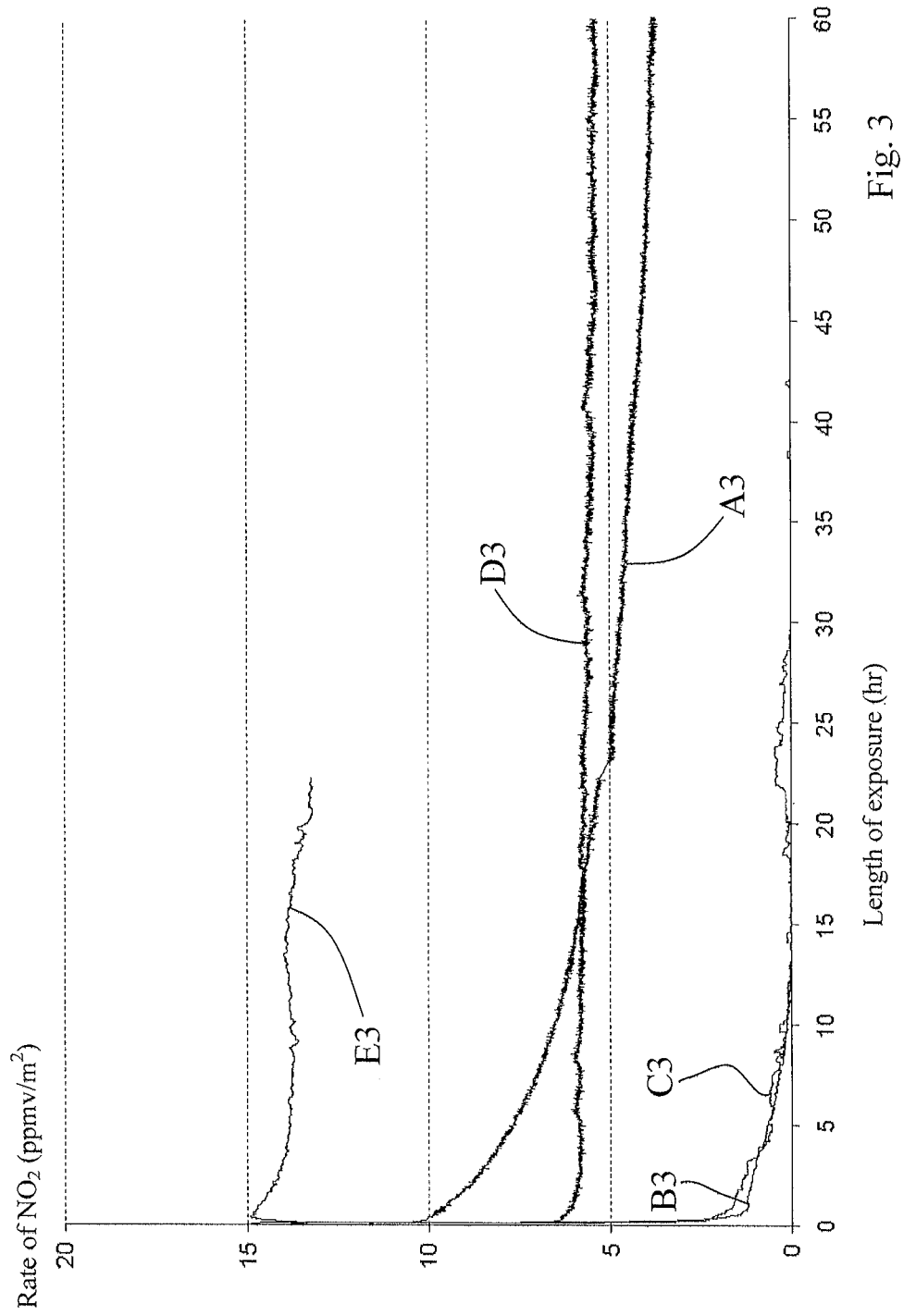
FIG. 3 represents changes in the rates of nitrogen dioxide adsorbed per surface unit for the same samples.

FIG. 2 represents the curves A2, B2, C2, D2 and E2 of content of nitrogen dioxide of a gas flow respectively after its passage respectively on samples A, B, C, D and E. FIG. 3 represents the curves A3, B3, C3, D3 and E3 of absorbed rates of nitrogen dioxide per unit surface respectively for samples A, B, C, D and E.

A lasting adsorption of nitrogen dioxide by sample A is observed. The adsorption rate per surface unit is initially approximately 9.3 ppmv/m$^2$ (after 1 hour) and decreases over time. After 600 min (10 hr), it is 6.5 ppmv/m$^2$. Finally, after 3600 min (60 hours), it is 3.6 ppmv/m$^2$.

A low adsorption of nitrogen dioxide by samples B and C is observed. More precisely, the adsorption rate per surface unit is initially less than 2.0 ppmv/m$^2$, then quickly decreases to be substantially equal to zero after a few hundred minutes.

A lasting adsorption of nitrogen dioxide by sample D is observed. The adsorption rate per surface unit is initially 6.1 ppmv/m$^2$ (after one hour) and decreases very slowly over time. After 3600 min (60 hours), it is 5.4 ppmv/m$^2$. After approximately 1000 min, the adsorption rate of sample D made according to the present invention is higher than the adsorption rate of the sample made without using active carbon. The present invention thus makes it possible to maintain a high adsorption rate of nitrogen dioxide over time.

A lasting and almost complete adsorption of nitrogen dioxide by sample E is observed. The adsorption rate per surface unit is initially 14.7 ppmv/m$^2$ (after 1 hour) and decreases very slowly over time. After 1320 min (22 hours), it is 13.2 ppmv/m$^2$. After approximately 1000 min, the adsorption rate of sample E made according to the present invention is higher than the adsorption rate of the sample A made without using active carbon in the mass. The present invention thus makes it possible to maintain a very high adsorption rate of nitrogen dioxide over time.

Example 6

After having measured the adsorption of nitrogen monoxide and nitrogen dioxide by sample D according to the invention in Example 4, sample D was arranged in an enclosure in which a neutral gas circulates at atmospheric pressure. The contents of nitrogen monoxide and nitrogen dioxide in the flow downstream of sample D were measured. Sample D was maintained at a temperature of 115° C. for 400 minutes.

Figure 4:
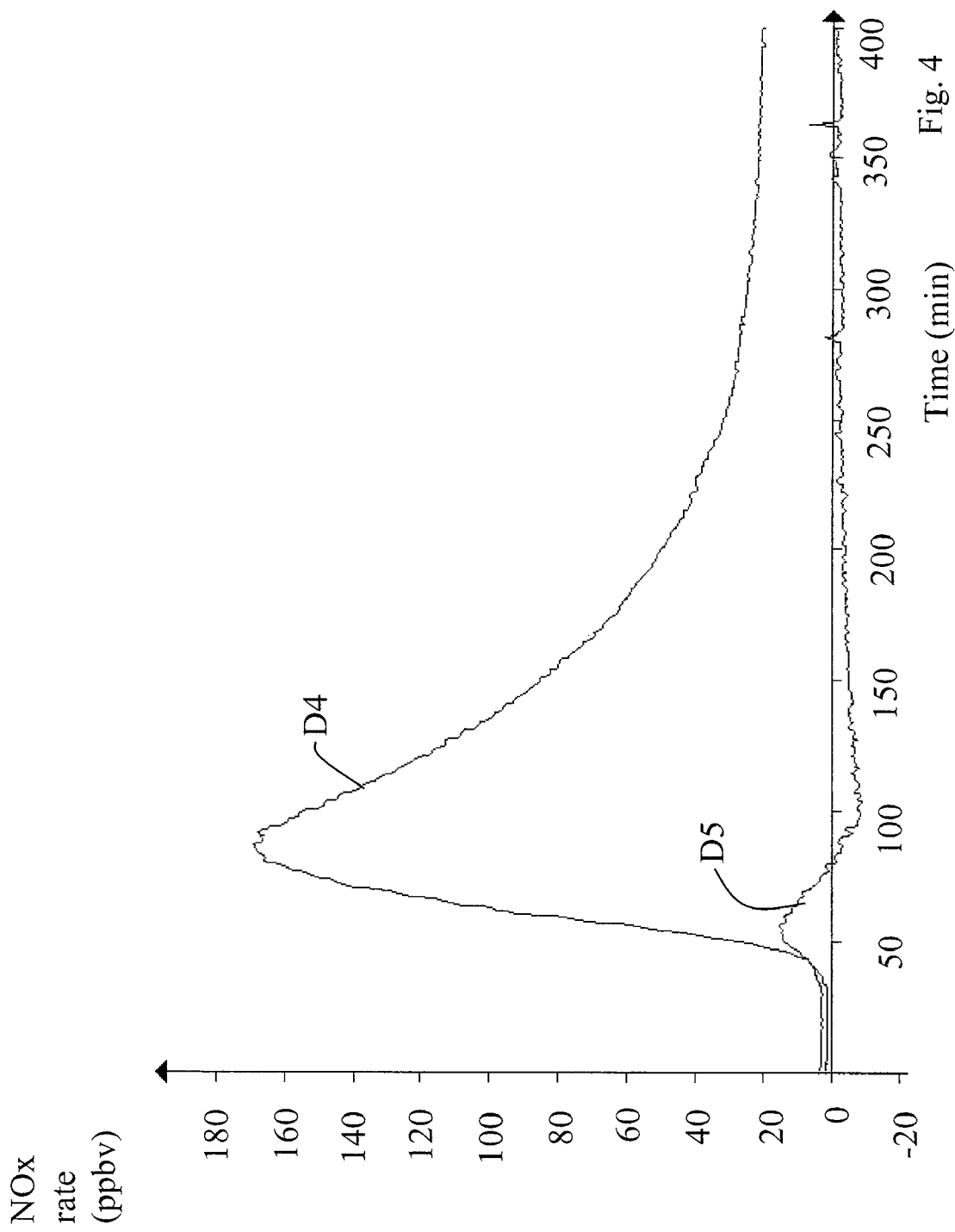
FIG. 4 represents the change in the contents of nitrogen dioxide and nitrogen monoxide of a gas flow after passage on a sample according to the invention during a desorption phase of the sample.

FIG. 4 represents the D4 curve of change of the content of nitrogen monoxide in the flow downstream of sample D and the D5 curve of change of the content of nitrogen dioxide in the flow downstream of sample D. Sample D releases adsorbed nitrogen monoxide when it is heated. However, nitrogen dioxide is not released by sample D even when it is heated to over 100° C.

The invention claimed is:

1. A method comprising using an element which comprises a monoblock concrete body with a volume greater than 1 L and a surface porosity greater than 8%, which body comprises in the body and/or on a surface thereof a compound having a BET specific surface greater than 100 m$^2$/g, and which element does not comprise a photocatalytic agent, to adsorb from the atmosphere nitrogen dioxide, wherein the compound is selected from the group consisting of active carbon, modified active carbon, silica gel, pyrogenic silica, diatomite, zeolite and alumina and porous hybrid solids, and wherein the adsorption rate of nitrogen dioxide per unit surface is greater than 0.5 ppbv/cm$^2$.

2. The method according to claim 1, wherein the BET specific surface exchange area of the compound is greater than 500 m$^2$/g.

3. The method according to claim 1, wherein the compound comprises particles having an average diameter greater than 1 μm.

4. The method according to claim 1, wherein the concrete has a surface porosity greater than 10%.

5. The method according to claim 1, wherein the average diameter of the pores in the surface of the body is greater than 0.10 μm.

6. The method according to claim 1, wherein the compound is distributed in the totality of the concrete body.

7. The method according to claim 1, wherein the concrete body is obtained by casting concrete in a mould, and in which the compound is disposed in a demoulding composition.

8. The method according to claim 1, wherein the element is obtained by mixing a hydraulic binder, aggregates, the aforesaid compound and water.

9. The method according to claim 1, wherein said compound is active carbon.

10. A method comprising adsorbing nitrogen dioxide using an element which comprises a monoblock concrete body having a surface porosity greater than 8%, which body comprises in the body and/or at least on a surface thereof a compound having a BET specific surface greater than 100 m$^2$/g, and which element does not comprise a photocatalytic agent, and said compound is selected from the group consisting of active carbon, modified active carbon, silica gel, pyrogenic silica, diatomite and alumina and porous hybrid solids, wherein the adsorption rate of nitrogen dioxide per unit surface is greater than 0.5 ppbv/cm$^2$.

11. The method according to claim 10, wherein said compound is active carbon.

* * * * *